(12) United States Patent
Tanabe et al.

(10) Patent No.: US 6,877,471 B1
(45) Date of Patent: Apr. 12, 2005

(54) ENGINE CONTROL DEVICE (75) Inventors: Tsuneo Tanabe, Hyogo (JP); Satoshi Hashimoto, Hyogo (JP); Takayuki Yano, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/953,523

(22) Filed: Sep. 30, 2004

(30) Foreign Application Priority Data

Apr. 19, 2004 (JP) .................................... P2004-122985

(51) Int. Cl.$^7$ .............................................. F02M 35/10
(52) U.S. Cl. ................................. 123/184.21; 123/395
(58) Field of Search .............................. 123/319, 395, 123/184.21, 184.22; 73/116, 118.2

(56) References Cited

FOREIGN PATENT DOCUMENTS

JP          2001-159574 A      6/2001

*Primary Examiner*—Bibhu Mohanty
(74) *Attorney, Agent, or Firm*—Sughrue Mion, PLLC (57) ABSTRACT

A engine control device includes a failure judgment means for making at least a failure judgment of an intake pipe pressure sensor. The failure judgment means includes a first data processing for outputting an estimated intake pipe pressure signal, a second data processing for outputting a modification estimated intake pipe pressure signal in which the estimated intake pipe pressure signal is modified, and a failure judgment processing for making a failure judgment of at least the intake pipe pressure sensor by comparing the measured intake pipe pressure signal with the modification estimated intake pipe pressure signal. The modification estimated intake pipe pressure signal has a change portion changing between a change portion of the estimated intake pipe pressure signal and a change portion of the measured intake pipe pressure signal, when the throttle valve opening degree is changed.

7 Claims, 7 Drawing Sheets

ENGINE CONTROL DEVICE

BACKGROUND OF THE INVENTION

1. Field of the Invention

The present invention relates to an engine control device for controlling the fuel injection amount of an engine mounted in an automobile or the like, and particularly to an engine control device having a failure judgment means to judge the failure of at least an intake pipe pressure sensor for detecting the measured intake pipe pressure of an engine.

2. Description of the Related Art

JP-A-2001-159574 proposes a diagnostic device for judging the failure of an intake pipe pressure sensor. This diagnostic device includes arithmetic means for calculating an estimated intake pipe pressure or an estimated intake pipe pressure equivalent value, an intake pipe pressure sensor for outputting a measured intake pipe pressure, and failure judgment means, in which the failure of the in take pipe pressure sensor is judged by comparing the estimated intake pipe pressure or the estimated intake pipe pressure equivalent value with the measured intake pipe pressure.

Figure 7:
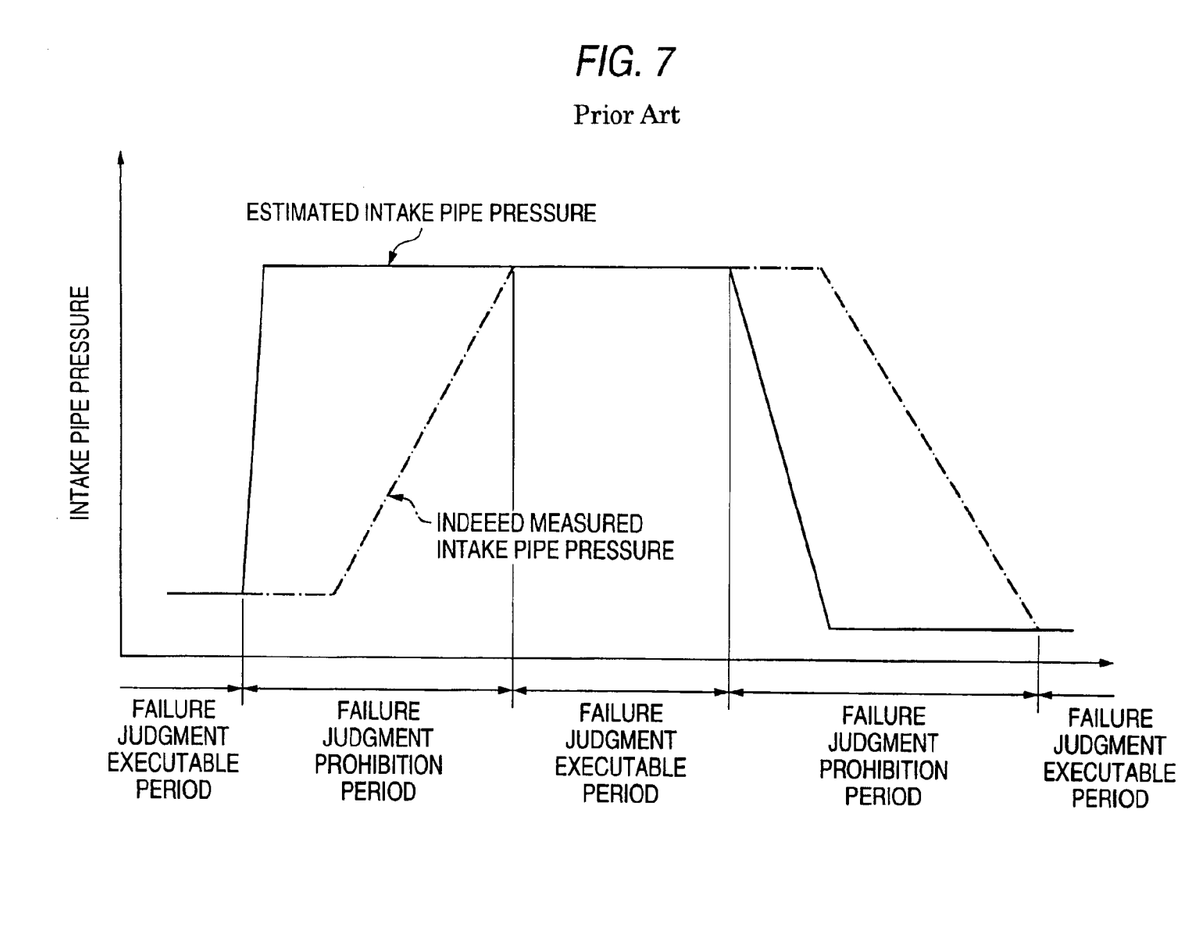
FIG. 7 is a graph showing changes of a conventionally used estimated intake pipe pressure and indeed measured intake pipe pressure.

However, even if the failure diagnostic device disclosed in the prior art is adopted, in the case where a throttle valve opening degree is changed by an accelerator operation or the like of a driver of an automobile, even if the estimated intake pipe pressure is changed as indicated by a solid line in FIG. 7, the measured intake pipe pressure is changed later than the estimated intake pipe pressure as indicated by an alternate long and short dash line in FIG. 7. Thus, at the time of change of the throttle valve opening degree and for a transitional period of a specified time subsequent to this, a deviation occurs between the estimated intake pipe pressure and the measured intake pipe pressure. When the failure judgment of the intake pipe pressure sensor is performed in this transitional period, an erroneous judgment occurs, and therefore, it is necessary that the transitional period is made a failure judgment prohibition period.

Figure 8:
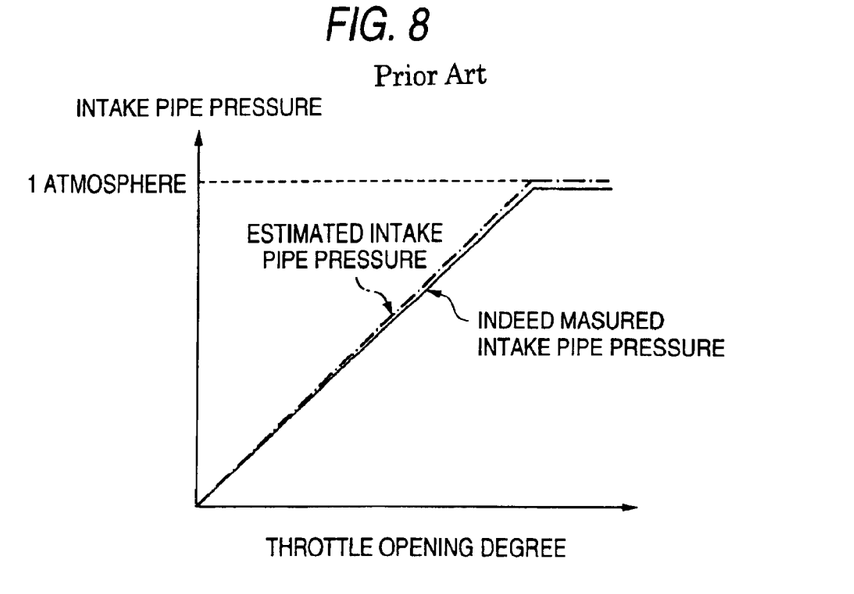
FIG. 8 is a graph showing changes of the conventionally used estimated intake pipe pressure and indeed measured intake pipe pressure with respect to the atmospheric pressure.
Figure 9:
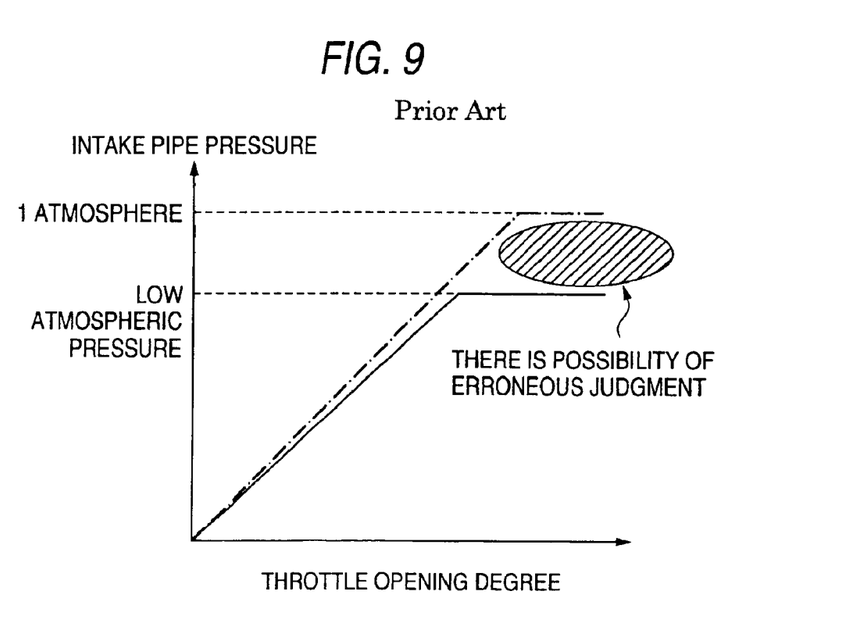
FIG. 9 is a graph showing changes of the conventionally used estimated intake pipe pressure and indeed measured intake pipe pressure with respect to the atmospheric pressure.

Besides, in the calculation of the estimated intake pipe pressure, in the case where the calculation is performed on the premise that the atmospheric pressure is 1 atmosphere, as shown in FIG. 8, as the throttle valve opening degree is increased, the estimated intake pipe pressure rises up to 1 atmosphere. However, in a low atmospheric pressure state in which the atmospheric pressure is lower than 1 atmosphere at a high altitude or the like, as shown in FIG. 9, in a range where the throttle valve opening degree is a specified value or higher, the measured intake pipe pressure is kept at the lower atmospheric pressure. Thus, a deviation occurs between the measured intake pipe pressure and the estimated intake pipe pressure, and there is fear that an erroneous judgment of failure occurs even in this state. In order to prevent the erroneous judgment of failure, it is necessary that an atmospheric pressure sensor is provided to detect the atmospheric pressure, and the failure judgment is prohibited at the time of low atmospheric pressure.

Besides, in an engine control device using two throttle position sensors, that the throttle position sensor used for the failure judgment of an intake pipe pressure sensor is normal must be judged by a failure judgment function dedicated for the throttle position sensor. This increases a processing time of the engine control device and increases a memory capacity, and there is a disadvantage that the load of the engine control device becomes large.

SUMMARY OF THE INVENTION

A first object of the invention is to provide an engine control device improved so that it is not necessary to prohibit a failure judgment even in the transitional period when the throttle valve opening degree is changed.

A second object of the invention is to provide an engine control device improved so that it is not necessary to prohibit the failure judgment even in the transitional period, and an erroneous judgment at the low atmospheric pressure can be prevented without detecting the atmospheric pressure.

A third object of the invention is to provide an engine control device in which it is not necessary to prohibit the failure judgment even in the transitional period, and the failure judgment function dedicated for the throttle position sensor is unnecessary, so that a processing time and memory capacity can be reduced.

According to a first aspect of the invention, an engine control device includes a throttle position sensor for outputting a throttle position signal indicating a throttle valve opening degree, a revolution speed sensor for outputting a engine revolution speed signal, and an intake pipe pressure sensor for outputting a measured intake pipe pressure signal. The engine control device has at least a failure judgment means for judging a failure of the intake pipe pressure sensor. The failure judgment means includes a first data processing, a second data processing, and a failure judgment processing. The first data processing outputs an estimated intake pipe pressure signal on the basis of the throttle position signal from the throttle position sensor and the engine revolution speed signal from the revolution speed sensor. The second data processing outputs a modification estimated intake pipe pressure signal in which the estimated intake pipe pressure signal is modified. The failure judgment processing makes a failure judgment of at least the intake pipe pressure sensor by comparing the measured intake pipe pressure signal with the modification estimated intake pipe pressure signal. The modification estimated intake pipe pressure signal has a change portion changing between a change portion of the estimated intake pipe pressure signal and a change portion of the measured intake pipe pressure signal, when the throttle valve opening degree is changed.

An engine control device according to a second aspect of the invention is characterized in that in the engine control device of the first aspect, a pressure judgment processing is performed as to whether the estimated intake pipe pressure signal is larger than the signal indicating the measured intake pipe pressure, and whether the measured intake pipe pressure signal is larger than a specified pressure value, and the failure judgment processing is performed on the basis of a result of the pressure judgment processing.

An engine control device according to a third aspect of the invention includes a first and second throttle position sensors each for outputting a throttle position signal indicating a throttle valve opening degree, a revolution speed sensor for outputting a engine revolution speed signal, and an intake pipe pressure sensor for outputting a measured intake pipe pressure signal. The engine control device has a failure judgment means for making a failure judgments of the intake pipe pressure sensor and the first and second throttle position sensors. The failure judgment means has a first failure judgment function and a second failure judgment function. The first failure judgment function includes a first data processing, a second data processing, and a first failure judgment processing. The first data processing outputs a first estimated intake pipe pressure signal on the basis of the throttle position signal from the first throttle position sensor and the engine revolution speed signal from the revolution speed sensor. The second data processing outputs a first modification estimated intake pipe pressure signal by modifying the first estimated intake pipe pressure signal. The first failure judgment processing makes a first failure judgment by comparing the measured intake pipe pressure signal with the first modification estimated intake pipe pressure signal. The first modification estimated intake pipe pressure signal includes a change portion changing between a change portion of the first estimated intake pipe pressure signal and a change portion of the measured intake pipe pressure signal, when the throttle valve opening degree is changed. The second failure judgment function includes a third data processing, a fourth data processing, and a second failure judgment processing. The third data processing outputs a second estimated intake pipe pressure signal on the basis of the throttle position signal from the second throttle position sensor and the engine revolution speed signal from the revolution speed sensor. The fourth data processing outputs a second modification estimated intake pipe pressure signal by modifying the second estimated intake pipe pressure signal. The second failure judgment processing makes a second failure judgment by comparing the measured intake pipe pressure signal with the second modification estimated intake pipe pressure signal. The second modification estimated intake pipe pressure signal includes a change portion changing between a change portion of the second estimated intake pipe pressure signal and a change portion of the measured intake pipe pressure signal, when the throttle valve opening degree is changed. The failure judgment by the failure judgment means is made on the results of the first failure judgment and the second failure judgment.

In the engine control device of the first aspect of the invention, since the modification estimated intake pipe pressure signal has a change portion changing between a change portion of the estimated intake pipe pressure signal and a change portion of the measured intake pipe pressure signal, when the throttle valve opening degree is changed, even in the transitional period in which the throttle valve opening degree is changed, it is not necessary to prohibit the failure judgment, and the failure judgment can be performed.

In the engine control device of the second aspect of the invention, in addition to the effect of the engine control device of the first aspect, the pressure judgment processing is performed as to whether the estimated in take pipe pressure signal is larger than the signal indicating the measured intake pipe pressure, and whether the measured intake pipe pressure signal is larger than the specified pressure value, and the failure judgment processing is performed on the basis of the result of the pressure judgment processing. Thus, an erroneous judgment at the time of low atmospheric pressure can be avoided without installing a specific atmospheric pressure sensor.

In the engine control device of the third aspect of the invention, in addition to the effect of the engine control device of the first aspect, since the failure judgment of the first and the second throttle position sensors is performed on the basis of the results of the first failure judgment and the second failure judgment, a failure judgment function dedicated for the throttle position sensor becomes unnecessary, and the processing time and memory capacity for that are reduced, and at the same time, the failure of the intake pipe pressure sensor and the first and the second throttle position sensors can also be judged.

DETAILED DESCRIPTION OF THE INVENTION

Hereinafter, some embodiments of this invention will be described with reference to the drawings.

Embodiment 1

Figure 1:
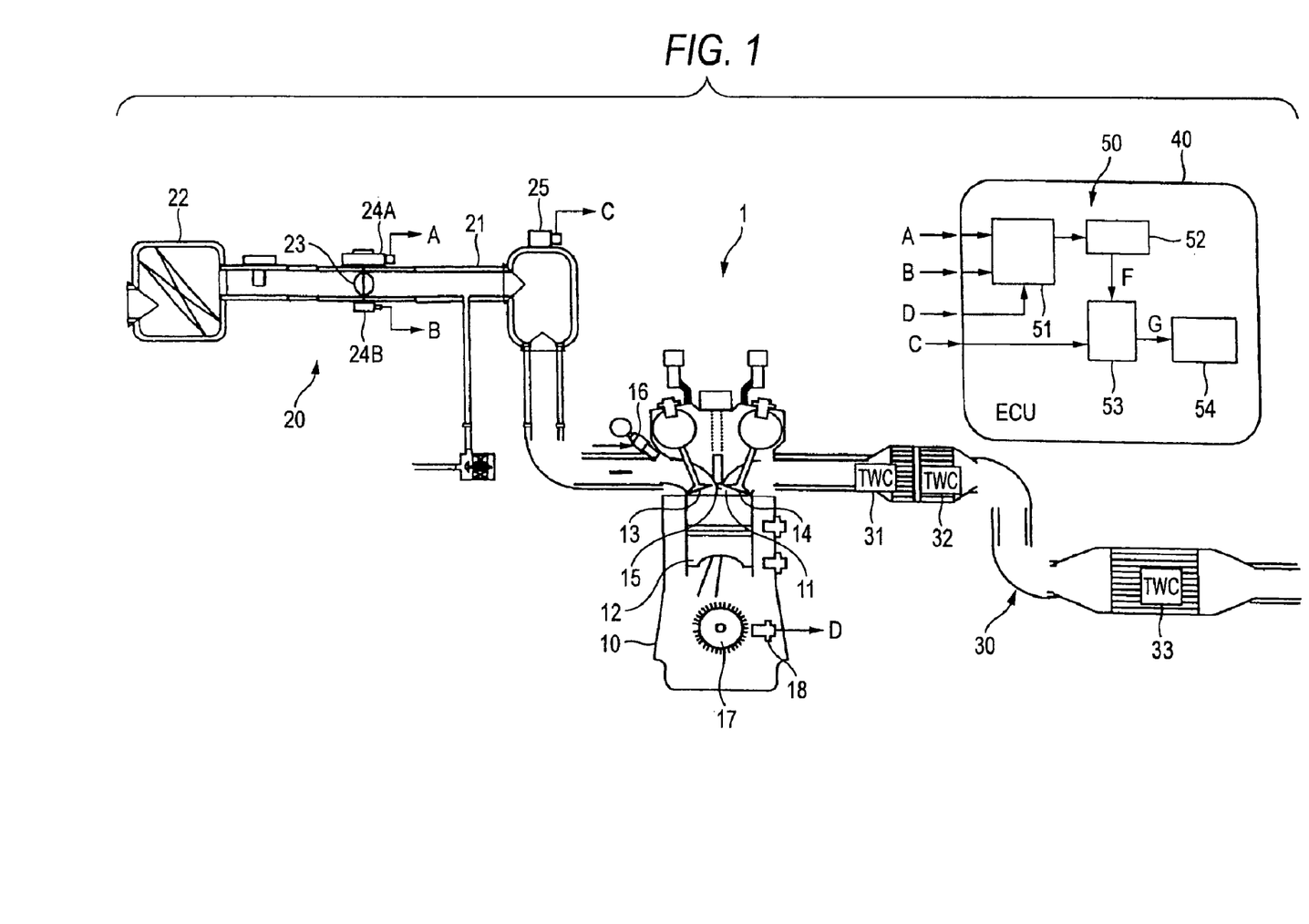
FIG. 1 is a structural view showing an engine control device of embodiment 1 of this invention, together with an engine apparatus.

FIG. 1 shows an engine control device of embodiment 1 of this invention, together with an engine. In FIG. 1, an engine apparatus 1 is mounted in an automobile, and includes an engine 10 and an engine control device 40. An intake device 20 of the engine and an exhaust device 30 of the engine are provided for the engine 10.

The engine 10 includes a combustion chamber 11, a piston 12, an intake valve 13, an exhaust valve 14, and an ignition device 15, and a fuel injection device 16 is disposed near the intake valve 13. An engine revolution speed sensor 18 is disposed near a crank shaft 17 of the engine 10. The revolution speed sensor 18 is a crank angle sensor, and outputs a signal D indicating an engine revolution speed N.

The intake device 20 of the engine is coupled to the combustion chamber 11 through the intake valve 13. This intake device 20 includes an in take pipe 21, an air filter 22, a throttle valve 23, throttle position sensors 24A and 24B, and an intake pipe pressure sensor 25.

The air filter 22 is disposed at an inlet portion of the intake pipe 21. The throttle valve 23 is disposed in the intake pipe 21 so as to control the size of the intake passage of the intake pipe 21. This throttle valve 23 is an electric control throttle, and its throttle valve opening degree Tho is electrically controlled in accordance with the depression of an accelerator pedal operated by a driver of the automobile.

The throttle position sensors 24A and 24B are provided for the throttle valve 23. The throttle position sensors 24A and 24B are mechanically coupled to the throttle valve 23 and outputs signals A and B indicating the throttle valve opening degree Tho. When the accelerator pedal is operated by the driver, the throttle valve opening degree Tho of the throttle valve 23 is electronically changed in accordance with the depression. In the electronic control of the throttle valve 23, the throttle position sensors 24A and 24B output the signals A and B indicating the throttle valve opening degree Tho, and the signals A and B and the accelerator signal according to the depression of the accelerator pedal are compared with each other, so that the throttle valve 23 is driven in accordance with the depression of the accelerator pedal. The throttle position sensors 24A and 24B are also used for a control to determine an idle revolution speed of the engine.

The intake pipe pressure sensor 25 outputs a signal C indicating a measured intake pipe pressure Ind_P in the intake pipe 21 at the downstream side of the throttle valve 23. The signal C indicating the measured intake pipe pressure Ind_P is used for determining the amount of fuel injected to the combustion chamber 11 from the fuel injection device 16.

The exhaust device 30 of the engine is coupled to the combustion chamber 11 through the exhaust valve 14 of the engine 10. Purification catalyst units 31, 32 and 33 for purifying the exhaust gas are disposed in the exhaust device 30.

The engine control device 40 is constructed of an electronic control unit (ECU) such as a microcomputer, and electrically controls the respective parts of the engine 10. The engine control device 40 performs the control of the throttle valve 23 using the throttle position sensors 24A and 24B, the control of the idle revolution speed using the throttle position sensors 24A and 24B, the control of the fuel injection amount using the intake pipe pressure sensor 25, and the ignition timing control for the ignition device 15.

The two throttle position sensors 24A and 24B are provided so that even if one of them goes wrong, the other can be substituted. For example, in the case where the first throttle position sensor 24A goes wrong, the second throttle position sensor 24B is used instead thereof.

The engine control device 40 includes a failure judgment unit 50. The failure judgment unit 50 includes a first data processing part 51, a second data processing part 52, a comparison part 53, and a failure judgment processing part 54. In embodiment 1, the failure judgment unit 50 makes a failure judgment on the intake pipe pressure sensor 25. In embodiment 1, a different unit judges that the throttle position sensor 24A or 24B and the crank angle sensor 18 are normal, and the failure of the intake pipe pressure sensor 25 is judged by using the output signals of the normal throttle position sensor 24A or 24B and the crank angle sensor 18.

The first data processing part 51 receives the signal A or B indicating the throttle valve opening degree Tho from the throttle position sensor 24A or 24B and the signal D indicating the engine revolution speed N from the revolution speed sensor 18, and outputs a signal E indicating an estimated intake pipe pressure Est_P. Specifically, in the first data processing part 51, estimated intake pipe pressure data previously stored in a memory of the engine control device 40 is retrieved. The estimated intake pipe pressure data is the data having the throttle valve opening degree Tho and the engine revolution speed N as parameters, and when the throttle valve opening degree Tho and the engine revolution speed N are given, the signal E indicating the estimated intake pipe pressure Est_P corresponding to them is outputted.

The second data processing part 52 receives the signal E indicating the estimated intake pipe pressure Est_P, calculates a modification estimated intake pipe pressure Mon_P, and outputs a signal F indicating the modification estimated intake pipe pressure Mon_P. The comparison part 53 is supplied with the signal F indicating the modification estimated intake pipe pressure Mon_P from the second calculation part 52 and the signal C indicating the measured intake pipe pressure Ind_P from the intake pipe pressure sensor 25. The comparison part 53 compares the modification estimated intake pipe pressure Mon_P and the measured intake pipe pressure Ind_P on the basis of the signal F and the signal C, and outputs a comparison result output G. The failure judgment processing part 54 receives the comparison result output G, and judges the failure of the intake pipe pressure sensor 25 on the basis of this.

Figure 2:
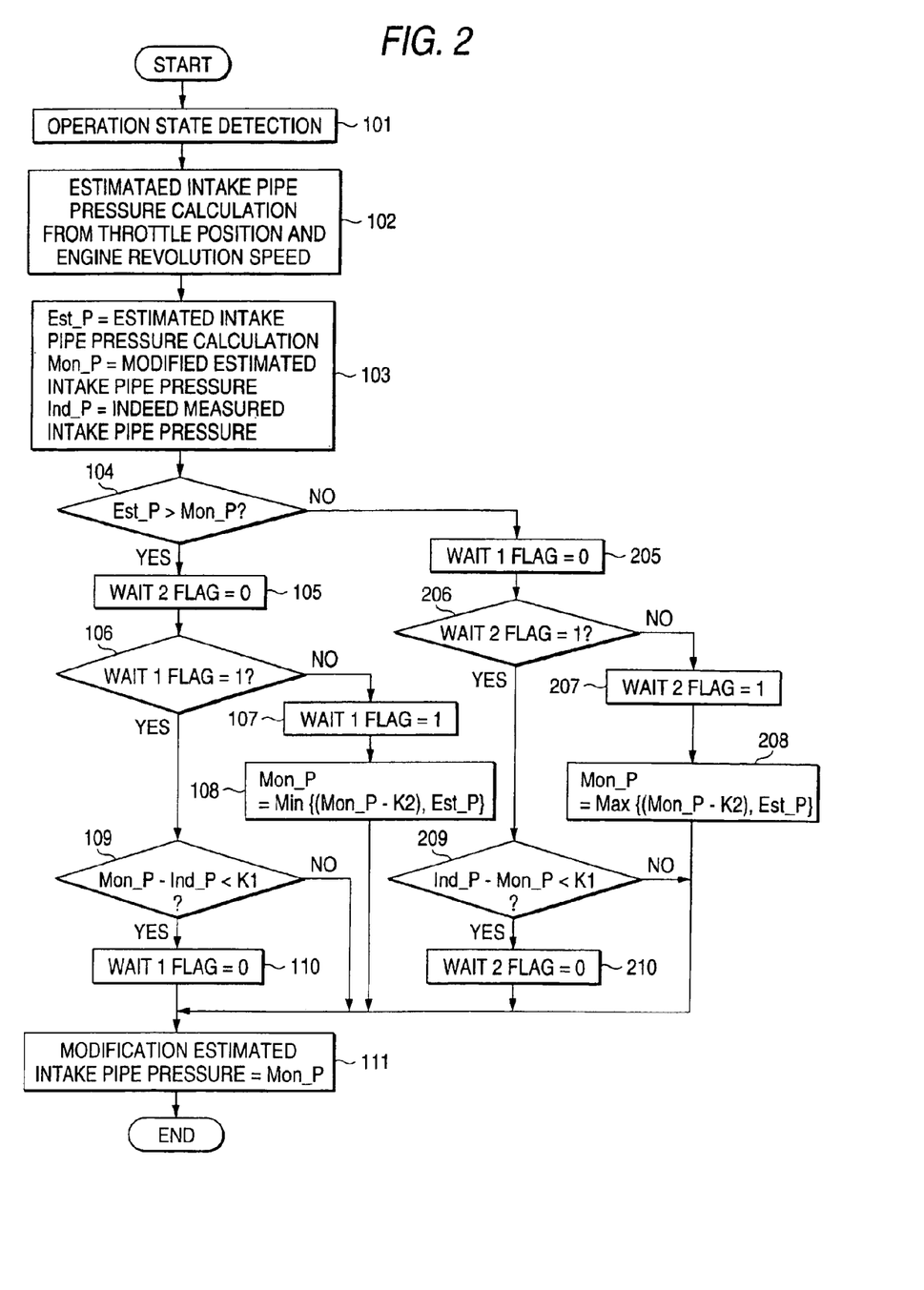
FIG. 2 is a flowchart of an operation for obtaining a modification estimated intake pipe pressure in embodiment 1.
Figure 3:
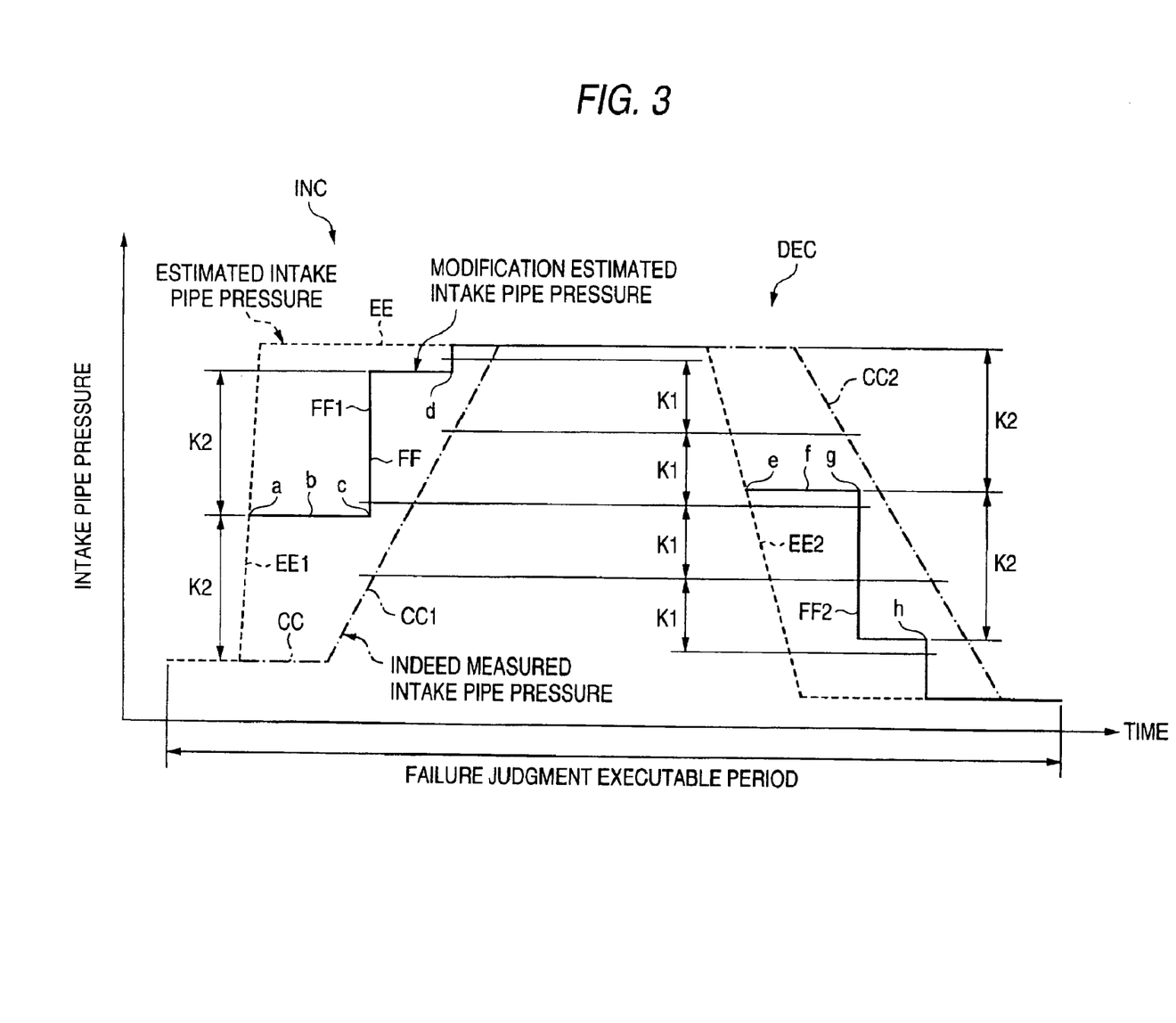
FIG. 3 is a graph showing the change of the modification estimated intake pipe pressure in embodiment 1, together with the changes of an estimated intake pipe pressure and a measured intake pipe pressure.

FIG. 2 is a flowchart of an operation to obtain the modification estimated intake pipe pressure Mon_P in the engine control device 40 in the embodiment 1. A routine shown in this flowchart is repeatedly performed at a constant period of, for example, 10 msec. FIG. 3 is a graph showing the modification estimated intake pipe pressure Mon_P obtained in embodiment 1 by using the flowchart of FIG. 2, together with the estimated intake pipe pressure Est_P and the measured intake pipe pressure Ind_P.

In FIG. 3, the vertical axis indicates the intake pipe pressure, and the horizontal axis indicates the time. A curved line EE of a thin solid line indicates the estimated intake pipe pressure Est_P, a curved line CC of a thick alternate long and short dash line indicates the measured intake pipe pressure Ind_P, and a curved line FF of a thick solid line indicates the modification estimated intake pipe pressure Mon_P. The left side of FIG. 3 shows an increase area INC in which the throttle valve opening degree Tho is increased, and its right side shows a decrease are a DEC in which the throttle valve opening degree Tho is decreased.

In the increase area INC, a rising portion EE1 appears on the curved line EE indicating the estimated intake pipe pressure Est_P, a rising portion CC1 appears on the curved line CC indicating the measured intake pipe pressure Ind_P later than this, and a rising portion FF1 of the curved line FF indicating the modification estimated intake pipe pressure Mon_P appears midway between the rising portions EE1 and CC1. On the other hand, in the decrease area DEC, a falling portion EE2 appears on the curved line EE indicating the estimated intake pipe pressure Est_P, a falling portion CC2 appears also on the curved line indicating the measured intake pipe pressure Ind_P later than this, and a falling portion FF2 of the curved line FF indicating the modification estimated intake pipe pressure Mon_P appears midway between the falling portions EE2 and CC2.

The flowchart shown in FIG. 2 includes steps 101 to 111, and steps 205 to 210 between its start and its end. First, at first step 101, the engine control device 40 detects the operation state of the engine 10 from the respective sensors. The signal A or B indicating the throttle opening degree Tho is captured from the throttle position sensor 24A or 24B, the signal C indicating the measured intake pipe pressure Ind_P is captured from the intake pipe pressure sensor 25, and the signal D indicating the engine revolution speed N is captured from the revolution speed sensor 18.

At next step 102, in the first data processing part 51, the estimated intake pipe pressure data previously stored in the memory is retrieved on the basis of the signal A or B indicating the throttle valve opening degree Tho and the signal D indicating the engine revolution speed N, so that the estimated intake pipe pressure Est_P is obtained.

At next step 103, Est_P is set to the estimated intake pipe pressure, Mon_P is set to the modification estimated intake pipe pressure, and Ind_P is set to the measured intake pipe pressure. Incidentally, at the first routine immediately after the power source of the engine control device 40 is turned on, the modification estimated intake pipe pressure Mon_P has not been calculated, and therefore, the estimated intake pipe pressure Est_P is set.

At next step 104, it is judged whether Est_P (estimated intake pipe pressure) is larger than Mon_P (modification estimated intake pipe pressure). That is, it is judged whether Est_P>Mon_P is established. When the judgment result is Yes, the procedure proceeds to step 105, and when the judgment result is No, the procedure proceeds to step 205.

The processing from step 105 to step 110 is the processing which corresponds to the increase area INC shown in FIG. 3 and gives the rising portion FF1 to the curved line FF indicating the modification estimated intake pipe pressure Mon_P. The processing from step 205 to step 210 is the processing which corresponds to the decrease area DEC shown in FIG. 3 and gives the falling portion FF2 to the curved line FF indicating the modification estimated intake pipe pressure Mon_P.

At step 105, a Wait2 flag is set to 0, and at next step 106, it is judged whether the Wait1 flag is 1. When the judgment result of this step 106 is No, the procedure proceeds to step 107, the Wait1 flag is set to 1, and step 108 is performed.

At step 108, the smaller one of (Mon_P+K2) and Est_P is set to the modification estimated intake pipe pressure Mon_P. At this step 108, in the state of Est_P>Mon_P at step 104, in order to cause the modification estimated in take pipe pressure Mon_P to approach the estimated intake pipe pressure Est_P, an addition processing to add a specified value K2 to the modification estimated intake pipe pressure Mon_P is performed, or the estimated intake pipe pressure Est_P at that time is set. Specifically, at point a of the rising portion FF1 shown in FIG. 3, the specified value K2 is added to the initial value (estimated intake pipe pressure Est_P) at step 108, and at step 111, (Est_P+K2) is set to the modification estimated intake pipe pressure. The specified value K2 is, for example, 250 mmHg.

When the judgment result of step 106 is Yes, the procedure proceeds to step 109, and it is judged whether a value obtained by subtracting the measured intake pipe pressure Ind_P from the modification estimated intake pipe pressure Mon_P is smaller than a specified value K1. That is, it is judged whether (Mon_P−Ind_P)<K1 is established. Like point b, when the modification estimated intake pipe pressure Mon_P is larger than the measured intake pipe pressure Ind_P by the specified value K1 or more, the judgment result at step 109 becomes No, and the modification estimated intake pipe pressure is kept as it is. The specified value is made, for example, 200 mmHg.

The indeed measured intake pipe pressure Ind_P rises and approaches the modification estimated intake pipe pressure Mon_P, and at point c, when a difference from the modification estimated intake pipe pressure Mon_P becomes smaller than the specified value K1, the judgment result at step 109 becomes Yes, and at step 110, the Wait1 flag is set to 0. In this state, since the judgment result at step 106 becomes No in a next performed routine, the specified value K2 is again added to the modification estimated intake pipe pressure Mon_P at step 108 through step 107, and the modification estimated intake pipe pressure Mon_P rises so as to approach the estimated intake pipe pressure Est_P.

The value of (Mon_P−Ind_P) becomes small by the rising of the measured intake pipe pressure Ind_P, and at point d, when the judgment result at step 109 becomes Yes again, the Wait1 flag is again set to 0, and in a next routine performed subsequently, the specified value K2 is added to the modification estimated intake pipe pressure Mon_P at step 108. However, at this point d, since the added value (Mon_P+2) exceeds the estimated intake pipe pressure Est_P, the modification estimated intake pipe pressure Mon-P is set to the estimated intake pipe pressure Est_P at that time, and the modification estimated intake pipe pressure Mon_P is restricted to the estimated intake pipe pressure Est_P. As a result, the curved line FF indicating the modification estimated intake pipe pressure Mon_P has the rising portion FF1 rising between the rising portion EE1 of the curved line EE indicating the estimated intake pipe pressure Est_P and the rising portion CC1 of the curved line CC indicating the measured intake pipe pressure Ind_P. The modification estimated intake pipe pressure Mon_P has the rising portion FF1 approaching the rising portion CC1 of the measured in take pipe pressure Ind_P from the rising portion EE1 of the estimated intake pipe pressure Est_P.

The Wait1 flag is set to 1 in the case where renewal is made by adding the specified value K2 to the modification estimated intake pipe pressure Mon_P, and when the Wait1 flag keeps 1 after this renewal, the modification estimated intake pipe pressure Mon_P is kept as it is, and then, when a difference between the modification estimated intake pipe pressure Mon_P and the measured intake pipe pressure Ind_P becomes smaller than the specified value K1 by the rising of the measured intake pipe pressure Ind_P, the Wait1 flag is set to 1 at step 107 through step 110 and step 106 of a next routine.

In the processing from step 205 to 210, by a similar processing of subtracting the specified value K2, in the decrease area DEC shown in FIG. 3, the falling portion FF2 is given to the curved line FF indicating the modification estimated intake pipe pressure Mon_P.

Specifically, at step 205, the Wait1 flag is set to 0, and at next step 206, it is judged whether the Wait2 flag is 1. When the judgment result at step 206 is No, the procedure proceeds to step 207, the Wait2 flag is set to 1, and step 208 is performed.

At this step 208, the larger one of (Mon_P−K2) and Est_P is set to the modification estimated intake pipe pressure. At this step 208, in the state of Est_P<Mon_P at step 104, in order to cause Mon_P to approach Est_P, the specified value K2 is subtracted from Mon_P, or Est_P at that time is set to the modification estimated in take pipe pressure. Specifically, at point e of the falling portion FF2 shown in FIG. 3, the specified value K2 is subtracted from the saturation value of the estimated intake pipe pressure Est_P at step 208, and at step 111, (Est_P−K2) is set to the modification estimated intake pipe pressure.

When the judgment result at step 206 is Yes, the procedure proceeds to step 209, and it is judged whether a value obtained by subtracting the modification estimated intake pipe pressure Mon_P from the measured intake pipe pressure Ind_P is smaller than the specified value K1. That is, it is judged whether Ind_P−Mon_P<K1 is established. Like point f, when the modification estimated intake pipe pressure Mon_P is smaller than the measured intake pipe pressure Ind_P by the specified value K1 or more, the judgment result at step 209 becomes No, and the modification estimated intake pipe pressure is kept as it is.

The indeed measured intake pipe pressure Ind_P is decreased, and when a difference from the modification estimated intake pipe pressure Mon_P becomes smaller than the specified value K1 at point g, the judgment result at step 209 becomes Yes, and at step 210, the Wait2 flag is set to 0. In this state, since the judgment result of step 206 becomes No in a next performed routine, the specified value K2 is again subtracted from the modification estimated intake pipe pressure Mon_P at step 208 through step 207, and the modification estimated intake pipe pressure Mon_P is decreased to approach the estimated in take pipe pressure Est_P.

At point h, the value of (Ind_P−Mon_P) becomes smaller than the specified value K1 by the lowering of the measured intake pipe pressure Ind_P, and when the judgment result at step 209 becomes Yes again, the Wait2 flag is again set to 0, and in a next routine subsequently performed, the specified value K2 is subtracted from the modification estimated intake pipe pressure Mon_P at step 208. However, at this point f, since the subtraction value (Mon_P−K2) becomes smaller than the estimated intake pipe pressure Est_P, the modification estimated intake pipe pressure is set to the estimated intake pipe pressure Est_P at that time, and is restricted to the estimated intake pipe pressure Est_P. As a result, in the decrease area DEC, the curved line FF indicating the modification estimated intake pipe pressure Mon_P has the falling portion FF2 falling between the falling portion EE2 of the curved line EE indicating the estimated intake pipe pressure Est_P and the falling portion CC2 of the curved line CC indicating the measured intake pipe pressure Ind_P. The modification estimated intake pipe pressure Mon_P has the falling portion FF2 approaching the falling portion CC2 of the measured intake pipe pressure Ind_P from the falling portion EE2 of the estimated intake pipe pressure Est_P.

The Wait2 flag is set to 1 in the case where the renewal is made by subtracting the specified value K2 from the modification estimated intake pipe pressure Mon_P, and when the Wait2 flag keeps 1 after this renewal, the modification estimated intake pipe pressure Mon_P is kept as it is. There after, when the different between the measured intake pipe pressure Ind_P and the modification estimated intake pipe pressure Mon_P becomes smaller than the specified value K1 by the lowering of the measured intake pipe pressure Ind_P, the Wait2 flag is set to 1 at step 207 through step 210 and step 206 of a next performed routine.

As stated above, in the increase area INC, the modification estimated intake pipe pressure Mon_P has the rising portion FF1 between the rising portion EE1 of the curved line EE indicating the estimated intake pipe pressure Est_P and the rising portion CC1 of the curved line CC indicating the measured intake pipe pressure Ind_P, and in the decrease area DEC, it has the falling portion FF1 between the falling portion EE2 of the curved line EE indicating the estimated intake pipe pressure Est_P and the falling portion CC2 of the curved line CC indicating the measured intake pipe pressure Ind_P. Thus, by comparing the modification estimated intake pipe pressure Mon_P and the measured intake pipe pressure Ind_P in the comparison part 53, as shown along the horizontal axis of FIG. 3, the failure judgment of the intake pipe pressure sensor 25 is enabled in all the area from the increase area INC to the decrease area DEC.

Figure 4:
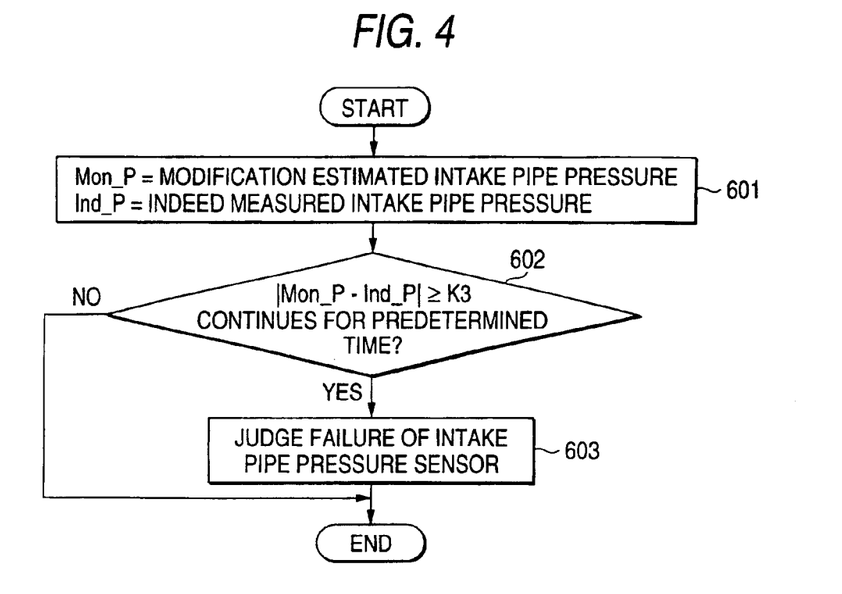
FIG. 4 is a flowchart showing an operation of a failure judgment processing of embodiment 1.

FIG. 4 is a flowchart showing a failure judgment operation of the intake pipe pressure sensor 25 according to embodiment 1. This flowchart includes step 601 to 603 between its start and its end. The flowchart shown in FIG. 4 is also repeatedly performed at a constant period of, for example, 10 msec.

First, at step 601, by the flowchart described in FIG. 2, Mon_P is set to the modification estimated in take pipe pressure, and Ind_P is set to the measured intake pipe pressure. At next step 602, it is judged whether a state in which a deviation (absolute value) between Mon_P and Ind_P is a predetermined value K3 or higher continues for a specified time or more. When this judgment result is Yes, at step 603, it is judged that the intake pipe pressure sensor 25 is out of order. When the judgment result at step 602 is No, the procedure proceeds to the end as it is, and the intake pipe pressure sensor 25 is not judged to be out of order, but is regarded as being normal.

Embodiment 2

Figure 5:
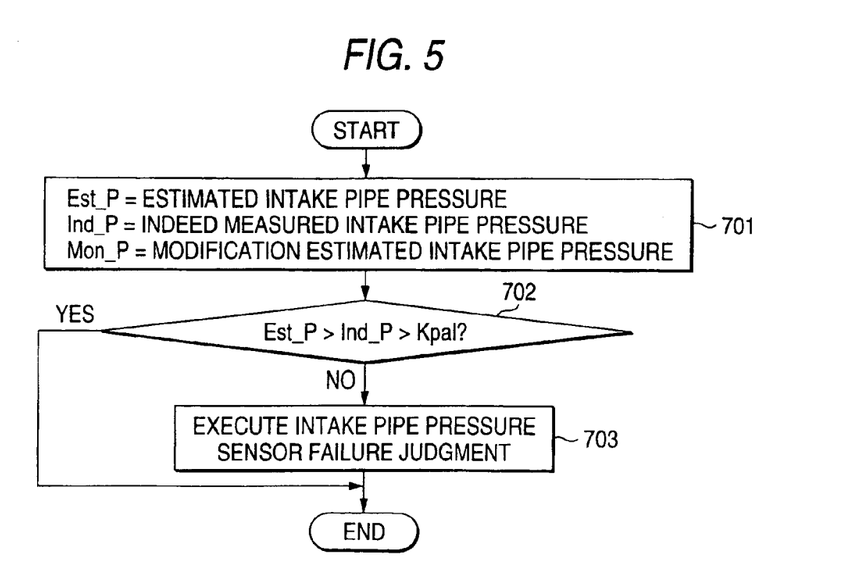
FIG. 5 is a flowchart showing an operation of a failure judgment processing in embodiment 2 of the engine control device of this invention.

FIG. 5 is a flowchart showing an operation of embodiment 2 of an engine control device of this invention. In this embodiment 2, the structure of embodiment 1 shown in FIG. 1 and the flowchart for obtaining the modification estimated intake pipe pressure Mon_P shown in FIG. 2 are used as they are, and the graph of the modification estimated intake pipe pressure shown in FIG. 3 is also applied as it is. In this embodiment 2, in the engine control device 40 shown in FIG. 1, a flowchart shown in FIG. 5 is used instead of the flowchart shown in FIG. 4. The flowchart of FIG. 5 is also repeatedly performed at a constant period of, for example, 10 msec.

The flowchart of FIG. 5 includes step 701 to 703 between its start and its end. First, at step 701, Est_P is set to the estimated intake pipe pressure, Ind_P is set to the measured intake pipe pressure, and Mon_P is set to the modification estimated intake pipe pressure. Est_P is captured as the signal E from the first data processing part 51 of FIG. 1, Ind_P is captured as the signal C from the intake pipe pressure sensor 25 of FIG. 1, and Mon-P is captured as the signal F from the second data processing part 52 of FIG. 1.

At next step 702, with respect to Est_P and Ind_P, it is judged whether a relation of Est_P>Ind_P>Kpal is established. Kpal is a constant indicating a specified pressure value. When the judgment result at step 702 is No, the procedure proceeds to step 703, and at step 703, a failure judgment is made as to whether the intake pipe pressure sensor 25 is out of order. The failure judgment at step 703 is made using the flowchart shown in FIG. 4. When the judgment result at step 702 is Yes, step 703 is not performed, and the procedure reaches the end as it is.

The state in which the relation of Est_P>Ind_P>Kpal is established is the state in which there is a possibility that the erroneous judgment shown in FIG. 9 occurs, and in embodiment 2, when this relation is established, the failure judgment of the intake pipe pressure sensor 25 is not made. Conventionally, in order to avoid this erroneous judgment, an atmospheric sensor is installed. Whereas, in embodiment 2, the erroneous judgment can be avoided without using this atmospheric sensor, and similarly to embodiment 1, at step 43, in the case where the failure judgment of the in take pipe pressure sensor 25 is made, there is an effect that the failure judgment can be made in all the area from the increase area INC of the intake pipe pressure to the decrease area DEC.

Embodiment 3

Figure 6:
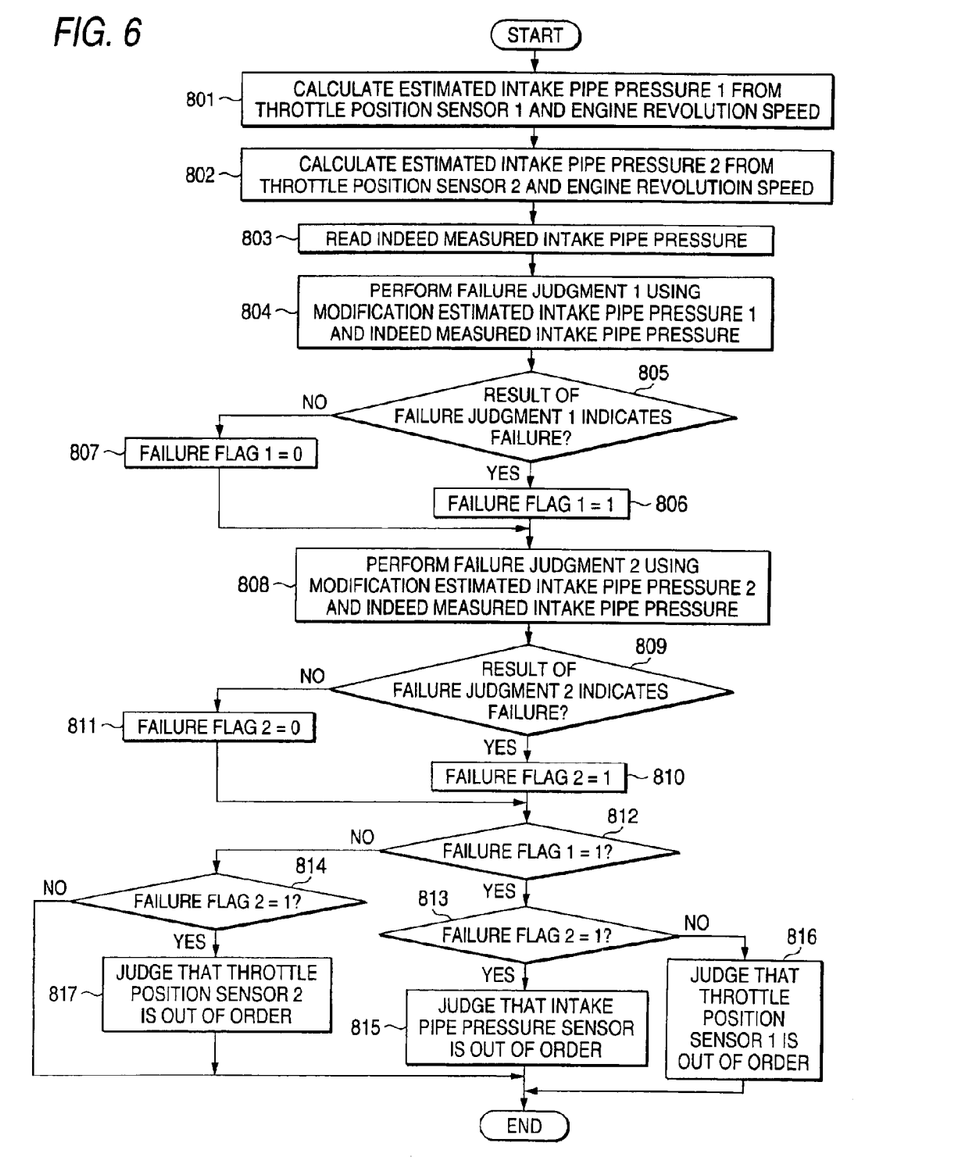
FIG. 6 is a flowchart showing an operation of a failure judgment processing in embodiment 3 of the engine control device of this invention.

FIG. 6 is a flowchart showing an operation of embodiment 3 of an engine control device according to this invention. The flowchart of FIG. 6 is also repeatedly performed at a constant period of, for example, 10 msec. The flowchart of FIG. 6 includes step 801 to step 817 between its start and its end.

In this embodiment 3, the failure of the two throttle position sensors 24A and 24B is judged in addition to the intake pipe pressure sensor 25. Also in this embodiment 3, the engine apparatus 1 and the engine control device 40 shown in FIG. 1 are used as they are. Besides, the setting flowchart of the modification estimated intake pipe pressure Mon_P shown in FIG. 2 is also used as it is at step 804 and step 808.

First, at step 801, the signal A from the first throttle position sensor 24A and the signal D indicating the engine revolution speed N from the revolution speed sensor 18 are used, and a signal E1 indicating a first estimated in take pipe pressure Est_P1 is outputted by the first data processing part 51. Besides, at next step 802, the signal B from the second throttle position sensor 24B and the signal D indicating the engine revolution speed N from the revolution speed sensor 18 are used, and a signal E2 indicating a second estimated intake pipe pressure Est_P2 is outputted by the first data processing part 51. These signals E1 and E2 are temporarily stored in the memory of the engine control device 40. At next step 803, the signal C indicating the measured intake pipe pressure Ind_P from the intake pipe pressure sensor 25 is read in and is temporarily stored in the memory.

At step 804, the signal E1 indicating the first estimated intake pipe pressure Est_P1 and the signal C indicating the measured intake pipe pressure Ind_P are used, and a signal F1 indicating a first modification estimated intake pipe pressure Mon_P1 is obtained by the second data processing part 52, and is temporarily stored in the memory. Subsequently, the signal F1 indicating the first modification estimated intake pipe pressure Mon_P1 and the signal C indicating the measured intake pipe pressure Ind_P are compared with each other by the comparison part 53 to output a first comparison result signal C1, and a first failure judgment is made in the failure judgment processing part 54. In this first failure judgment, similarly to the flowchart shown in FIG. 4, in the case where a state in which a deviation (absolute value) between the modification estimated intake pipe pressure Mon_P1 and the measured intake pipe pressure Ind_P is larger than a specified value K3continues for a specified time, a judgment that a failure occurs is made.

At step 805, it is judged whether the judgment result of the first failure judgment by the failure judgment processing part 54 is a failure, and when the judgment result is Yes, the procedure proceeds to step 806, and a first failure flag 1 is set to 1. When the judgment result of step 805 is No, the procedure proceeds to step 807, and the first failure flag 1 is set to 0.

At next step 808, the signal E2 indicating the second estimated intake pipe pressure Est_P2 and the signal C indicating the measured intake pipe pressure Ind_P are used, and a signal F2 indicating a second modification estimated intake pipe pressure Mon_P2 is obtained by the second data processing part 52 and is temporarily stored in the memory. Subsequently, the signal F2 indicating the second modification estimated intake pipe pressure Mon_P2 and the signal C indicating the measured intake pipe pressure Ind_P are compared with each other in the comparison part 53 to output a second comparison result signal G1, and a second failure judgment is made in the failure judgment processing part 54. Also in this second failure judgment, similarly to the flowchart shown in FIG. 4, in the case where a state in which a deviation (absolute value) between the modification estimated intake pipe pressure Mon_P2 and the measured intake pipe pressure Ind_P is larger than the specified value K3continues for a specified time, a judgment that a failure occurs is made.

At step 809, it is judged whether the result of the second failure judgment by the failure judgment processing part 54 is the failure, and when the judgment result is Yes, the procedure proceeds to step 810, and a second failure flag 2 is set to 1. When the judgment result of step 809 is No, the procedure proceeds to step 811, and the second failure flag 2 is set to 0.

At next step 812, it is judged whether the first failure flag 1 is 1, and when the judgment result is Yes, the procedure proceeds to step 813, and at step 813, it is judged whether the second failure flag 2 is 1. When the judgment result of step 812 is No, the procedure proceeds to step 814, and also at this step 814, it is judged whether the second failure flag 2 is 1.

When the judgment result of step 813 is Yes, the procedure proceeds to step 815, and at this step 815, it is judged that the intake pipe pressure sensor 25 is out of order. When the judgment result of step 813 is No, the procedure proceeds to step B16, and at this step 816, it is judged that the first throttle position sensor 24A is out of order.

When the judgment result at step 814 is Yes, the procedure proceeds to step 817, and at step 817, it is judged that the second throttle position sensor 24B is out of order. When the judgment result at step 814 is No, the intake pipe pressure sensor 25 and the first and the second throttle position sensors 24A and 24B are regarded as being normal, and the failure judgment processing is ended.

In embodiment 3, a failure judgment function dedicated for the throttle position sensor is unnecessary, the processing time and memory capacity for that are reduced, and the failure of the intake pipe pressure sensor 25 and the first and the second throttle position sensors 24A and 24B can be judged. In addition, similarly to embodiment 1, even in a transitional period in which the throttle valve opening degree is changed, it is not necessary to prohibit the failure judgment, and the failure judgment can be made.

The engine control device of this invention can be used for the control device of an engine mounted in an automobile.

What is claimed is:

1. An engine control device comprising:
   a throttle position sensor for outputting a throttle position signal indicating a throttle valve opening degree;
   a revolution speed sensor for outputting an engine revolution speed signal; and
   an intake pipe pressure sensor for outputting a measured intake pipe pressure signal,
   wherein the engine control device has at least a failure judgment means for judging a failure of the intake pipe pressure sensor,
   the failure judgment means includes a first data processing for outputting an estimated intake pipe pressure signal on the basis of the throttle position signal from the throttle position sensor and the engine revolution speed signal from the revolution speed sensor, a second data processing for outputting a modification estimated intake pipe pressure signal in which the estimated intake pipe pressure signal is modified, and a failure judgment processing for making at least a failure judgment of the intake pipe pressure sensor by comparing the measured intake pipe pressure signal with the modification estimated intake pipe pressure signal, and
   the modification estimated intake pipe pressure signal includes a change portion changing between a change portion of the estimated intake pipe pressure signal and a change portion of the measured intake pipe pressure signal, when the throttle valve opening degree is changed.

2. The engine control device according to claim 1, wherein in the second data processing, when the throttle opening degree is increased and the estimated intake pipe pressure signal is raised, an addition processing is performed in which a specified value is added to the modification estimated intake pipe pressure, and when the throttle valve opening degree is decreased, a subtraction processing is performed in which a specified value is subtracted from the modification estimated intake pipe pressure.

3. The engine control device according to claim 2, wherein the addition processing and the subtraction processing are performed when the signal indicating the measured intake pipe pressure approaches the modification estimated intake pipe pressure signal.

4. The engine control device according to claim 1, wherein in the failure judgment processing, when a state in which a deviation between the modification estimated intake pipe pressure signal and the signal indicating the measured intake pipe pressure is a specified deviation or higher continues for a specified time, the intake pipe pressure sensor is judged to be out of order.

5. The engine control device according to claim 1, wherein the failure judgment function further includes a pressure judgment processing, the pressure judgment processing is performed as to whether the estimated intake pipe pressure signal is larger than the measured intake pipe pressure signal and whether the measured intake pipe pressure signal is larger than a specified pressure value, and the failure judgment processing is performed on the basis of a result of the pressure judgment processing.

6. An engine control device comprising;
   a first and a second throttle position sensors, each of the first and second throttle position sensors outputs a throttle position signal indicating a throttle valve opening degree:
   a revolution speed sensor for outputting a engine revolution speed signal: and
   an intake pipe pressure sensor for outputting a measured intake pipe pressure signal:
   wherein the engine control device has a failure judgment means for making a failure judgments of the intake pipe pressure sensor and the first and second throttle position sensors, and the failure judgment means has a first failure judgment function and a second failure judgment function,
   the first failure judgment function includes a first data processing for outputting a first estimated intake pipe pressure signal on the basis of the throttle position signal from the first throttle position sensor and the engine revolution speed signal from the revolution speed sensor, a second data processing for outputting a first modification estimated intake pipe pressure signal by modifying the first estimated intake pipe pressure signal, and a first failure judgment processing for making a first failure judgment by comparing the measured intake pipe pressure signal with the first modification estimated intake pipe pressure signal,
   the first modification estimated intake pipe pressure signal includes a change portion changing between a change portion of the first estimated intake pipe pressure signal and a change portion of the measured intake pipe pressure signal,
   when the throttle valve opening degree is changed, the second failure judgment function includes a third data processing for outputting a second estimated intake pipe pressure signal on the basis of the throttle position signal from the second throttle position sensor and the engine revolution speed signal from the revolution speed sensor, a fourth data processing for outputting a second modification estimated intake pipe pressure signal by modifying the second estimated intake pipe pressure signal , and a second failure judgment processing for making a second failure judgment by comparing the measured intake pipe pressure signal with the second modification estimated intake pipe pressure signal,
   the second modification estimated intake pipe pressure signal includes a change portion changing between a change portion of the second estimated intake pipe pressure signal and a change portion of the measured intake pipe pressure signal, when the throttle valve opening degree is changed, and
   the failure judgment by the failure judgment means is made on the basis of results of the first failure judgment and the second failure judgment.

7. The engine control device according to claim 6, wherein when a judgment that a failure occurs is made at the first failure judgment, a first failure flag is set to 1, and when a judgment that a failure occurs is made at the second failure judgment, a second failure flag is set to 1, and in a case where both the first failure flag and the second failure flag are 1, the intake pipe pressure sensor is judged to be out of order, in a case where the first failure flag is 1 and the second failure flag is 0, the first throttle position sensor is judged to be out of order, and in a case where the first failure flag is 0 and the second failure flag is 1, the second throttle position sensor is judged to be out of order.

* * * * *